United States Patent

Tanaka et al.

[11] Patent Number: 6,079,779
[45] Date of Patent: Jun. 27, 2000

[54] STRUCTURE FOR SUPPORTING SKIN OF SEAT

[75] Inventors: Mitsuru Tanaka, Gifu-ken; Shinji Tanaka; Hiroshi Higano, both of Kanagawa-ken, all of Japan

[73] Assignee: Ikeda Bussen Co., Ltd, Kanagawa-ken, Japan

[21] Appl. No.: 09/209,260

[22] Filed: Dec. 10, 1998

[30] Foreign Application Priority Data

Dec. 12, 1997 [JP] Japan .................................. P9-343301

[51] Int. Cl.⁷ .................................................. A47C 31/02
[52] U.S. Cl. .................................. 297/228.13; 297/219.1; 297/228.1
[58] Field of Search ........................... 297/228.13, 228.1, 297/219.1, 218.1, 218.4, 218.5

[56] References Cited

U.S. PATENT DOCUMENTS

| | | | |
|---|---|---|---|
| 4,047,756 | 9/1977 | Ney | 297/228.13 X |
| 5,560,683 | 10/1996 | Penley et al. | 297/228.13 X |
| 5,615,928 | 4/1997 | Penley | 297/228.13 X |

*Primary Examiner*—Jose V. Chen
*Assistant Examiner*—Rodney B. White
*Attorney, Agent, or Firm*—Nath & Associates; Gary M. Nath; Harold L. Novick

[57] ABSTRACT

A structure for supporting a skin of a seat includes: a skin covering one of a seat cushion and a seat back constituting a seat which is provided with a slit; elements of a slider fastener supported to both of edge portions in which the slit of the skin is formed; and a slider of the slide fastener fastening both of the elements so as to close the slit. In the construction, both of the elements are extended from an end portion of the one of the seat cushion and the seat back; an end portion of the extended portion of the one of the elements is bent back to a back surface side of the skin; and the end portion is supported to the skin.

8 Claims, 5 Drawing Sheets

STRUCTURE FOR SUPPORTING SKIN OF SEAT

BACKGROUND OF THE INVENTION

1. Field of the Invention

The present invention relates to a seat for an automobile, particularly to a structure for supporting a skin of a seat which can hold the skin to a pad in a tensioning state by forming a slit on the skin and fastening a fastener supported to the slit in order to improve a detachability of the skin covered in a state of spreading the pad.

2. Description of the Related Art

As shown in FIG. 1, a seat 1 is structured by a seat cushion 2 and a seat back 3, and each of the structural member comprises a frame (not shown), pads 4,5 (5) formed by a polyurethane foam or the like covering the frame and having a cushion characteristic, and skins 6 (7) made of a fabric or the like covering the pads 4, (5) (refer to Japanese Utility Model Application laid-open No. 6-38794 as a similar art).

Among the skins 6 and 7, for example, the skin 7 provided in the seat back 3 is structured such as to form a portion easily viewed from an occupant on a design, for example, both shoulder portions 7a and 7a (in the drawing, only one shoulder portion 7a is shown but the other shoulder portion 7a is omitted) in a bag shape and form laterally spaced slits 8 on a rear portion 7b.

As shown in FIG. 2, tapes 10 and 10 of a slide fastener 9 are fixed on the rear RR side-surface of the rear portion 7b of the skin 7 along each slit 8 by sewing S. Engaging elements 11 and 11 are fixed to edge portions 10b and 10b in far sides of the respective tapes 10 and 10. A slider 12 is caused to previously mesh with upper end portions of the engaging elements 11 and 11.

Lower end portions 9a of the slide fastener 9, that is, lower end portions 10a of the tape 10 are positioned downwardly by a size H beyond a position of the lower end portion 3a of the seat back 3, as shown in FIG. 1, and a stopper 13 is provided in the lower end portions 9a, as shown in FIG. 3.

The stopper 13 comprise a butterfly rod 15 supported to a first reinforcing tape 14 fixed to the lower end portion 10a of the tape 10 on the rear portion 7b of the skin 7 of the seat back 3 and integrally formed with the engaging element 11 and a box rod 17 supported to a second reinforcing tape 16 fixed to the lower end portion 10a of the tape 10 on a side portion 7c of the skin 7 of the seat back 3 and integrally formed with the engaging element 11, as shown in FIG. 3.

With holding the butterfly rod 15 of the slide fastener 9, the first reinforcing tape 14 is twisted to the front side, as shown in FIG. 4. Next, as shown in FIG. 5, the slider 12 is moved on the engaging elements 11 by moving the slider 12 in a downward direction DW to the lower end portions 9a, then, the slit 8 can be made in a fastening state in accordance that the engaging elements 11 and 11 mesh with each other. Accordingly, the rear portion 7b of the skin 7 and the side portions 7c and 7c (only one side portion 7c is shown but the other side portion 7c is omitted) of the skin 7 are joined. Since the engaging elements 11 and 11 are released from each other upwardly moving the slider 12, it is possible to make the slit 8 in an opening state.

Further, as shown in a two-dot chain line in FIG. 7, the lower end portions 9a of the slide fastener 9 extending downwardly beyond the lower end portion 3a of the seat back 3 are pushed into a back surface side of the skin 7 from a clearance 18 formed between the rear portion 7b of the skin 7 and the lower end portion 3a of the seat back 3 as shown in a broken line in FIG. 6 and a solid line in FIG. 7, whereby the lower end portions 9a of the slide fastener 9 are seen to be just like the same position as that of the lower end portion 3a of the seat back 3.

However, since the lower end portions 9a of the slide fastener 9 are only pushed into the back surface side of the skin 7 of the seat back 3, a knob 12a of the slider 12 is put in a freely movable situation within the back surface of the skin 7 of the seat back 3, so that there is such a drawback that the knob 12a may generates foreign sounds due to vibrations in a running situation at a automobile, which is required to be improved.

Further, the lower end portions 9a of the slide fastener 9 are pushed into the back surface of the skin 7 of the seat back 3 from the clearance 18 in a process of assembling and manufacturing the seat back 3, but, the pushing-into positions are different according to respective workers and case by case, so that a predetermined position can not be determined. Accordingly, an improvement is desired.

Still further, since it is possible to easily insert a hand into the clearance 18 formed between the rear portion 7b of the skin 7 and the lower surface 7d of the skin 7, it is possible to draw out the slide fastener 9 when a child or the like inserts his/her hand into the clearance 18 and pulls the lower end portions 9a of the slide fastener 9 after mounting the seat 1 on the automobile. Accordingly, an improvement is desired.

The problems solved by the invention mentioned above are not inherent in the seat back 3 but apply to the seat cushion 2. In this case, it can be understood by replacing the lower end portion 3a of the seat back 3 by the rear end portion or the front end portion of the seat cushion 2, replacing the shoulder portions 7a and the rear portion 7b of the skin 7 by the corner portions of the front end portion or the rear end portion of the skin 6 and lower surface, respectively, replacing the lower end portions 9a of the slide fastener 9 by the rear end portions or the front end portions of the slide fastener 9, and replacing the lower end portions 10a of the tapes 10 by the rear end portions or the front end portions of the tapes 10.

SUMMARY OF THE INVENTION

The present invention is made by taking the problems mentioned above into consideration, and an object of the present invention is to provide a structure for supporting a skin of a seat in which end portions of a slide fastener can be received at a predetermined position in the skin of the seat, so that it is difficult that the end portions of the slide fastener is drawn out after the end portions of the slide fastener is received in the skin of the seat.

In accordance with a first aspect of the present invention, there is provided a structure for supporting a skin of a seat, comprising: a skin covering one of a seat cushion and a seat back constituting a seat, the skin being provided with a slit; engaging elements of a slider fastener supported to both of edge portions in which the slit of the skin is formed; and a slider of the slide fastener fastening both of the, engaging elements so as to close the slit, wherein both of the engaging elements are extended from an end portion of the one of the seat cushion and the seat back; an end portion of the extended portion of the one of the engaging elements is bent back to a back surface side of the skin; and the end portion is supported to the skin.

In accordance with the first aspect, the slider is guided to the back side of the skin by the one bent engaging element when operating the slider of the slide fastener is operated so as to fasten the engaging elements with each other, so that it is possible to stably receive the end portions of the slide fastener at a determined position of the skin of the seat and it is hard to draw out the slider after the end portions of the slide fastener is received in the skin of the seat.

In accordance with a second aspect depending from the first aspect, the structure for supporting a skin of a seat, further comprises: fabric tapes supported on both of the edge portions on which the slit of the skin is formed, both of the tapes being supported on an outer side surface of the skin, and both of the engaging elements being intermittently supported to both of the tapes respectively, wherein both of the tapes are extended from the end portion in one side of the seat cushion or the seat back; one of the extended tape is twisted at a suitable position; and one of the extended tapes which is twisted is bent back to the back surface side of the skin and supported to the skin at a portion apart from an end portion of the bent back portion.

In accordance with a third aspect depending from the second aspect, there is provided the structure for supporting a skin of a seat, the slit is formed substantially in a vertical direction; and both of the tapes are extended downward.

In accordance with a fourth aspect depending from the third aspect, there is provided the structure for supporting the skin of the seat, another slit is formed in the skin and the slit and the other slit are parallel to each other.

In accordance with the second aspect to the fourth aspect, at least one of the seat cushion and the seat back, the skin separated by the slit is joined when fastening the engaging elements disposed in the outer surfaces side of the edge portions of the slit by the slider, and in the portions extended from the end portion of at least one of the seat cushion and the seat back, the slider is guided to the engaging elements disposed in the side of the inner side surface of the edge portions of the slit and the slider moves inside the skin, so that the movement of fastening can be smoothly performed by a twisting motion of the tape.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
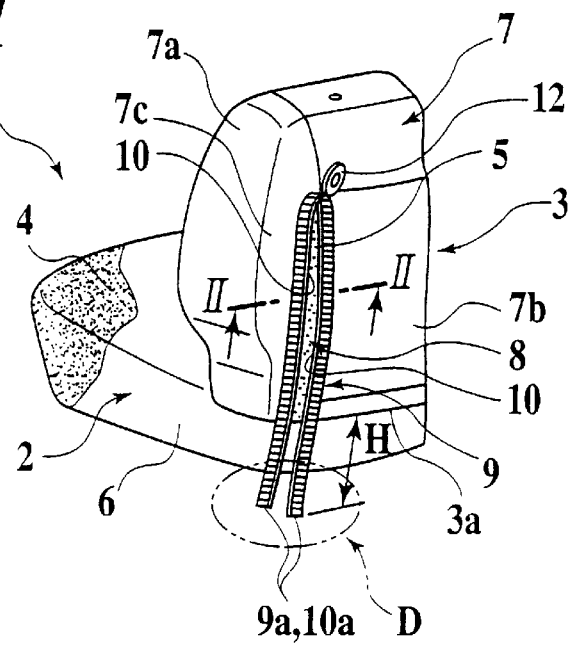
FIG. 1 is a perspective view as seen from an oblique rear portion a state of opening a slide fastener of a seat in accordance with the prior art.
Figure 2:
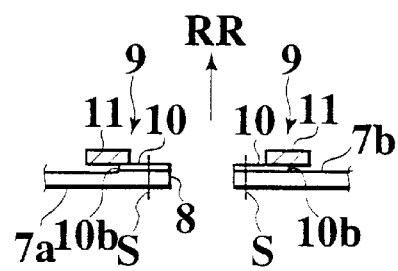
FIG. 2 is a cross sectional view along a line II—II in FIG. 1.

There will be detailed below the preferred embodiments of the present invention with reference to the accompanying drawings. Like members are designated by like reference characters.

Figure 8:
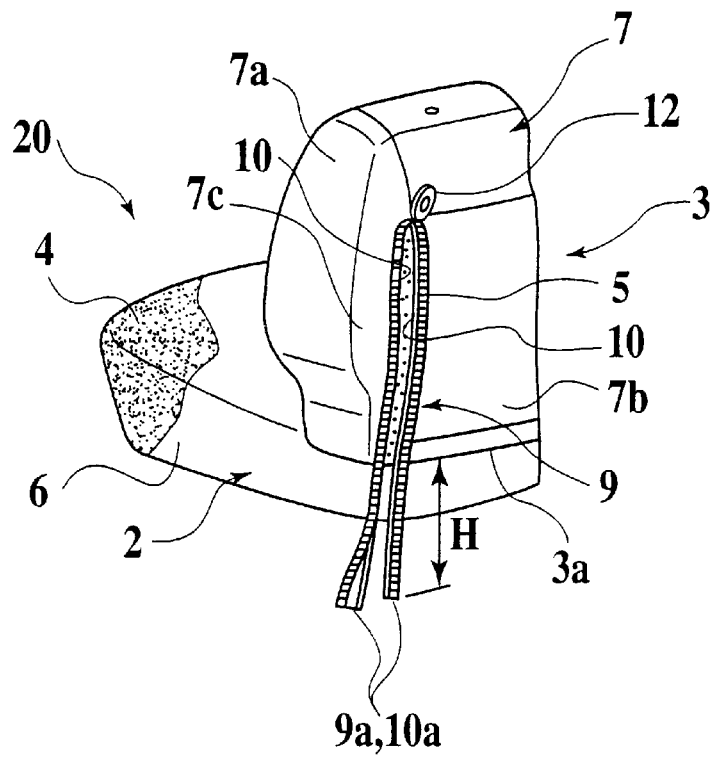
FIG. 8 is a perspective view as seen from an oblique rear Portion in a state of opening a slide fastener of a seat which shows an embodiment in accordance with the present invention.
Figure 9:
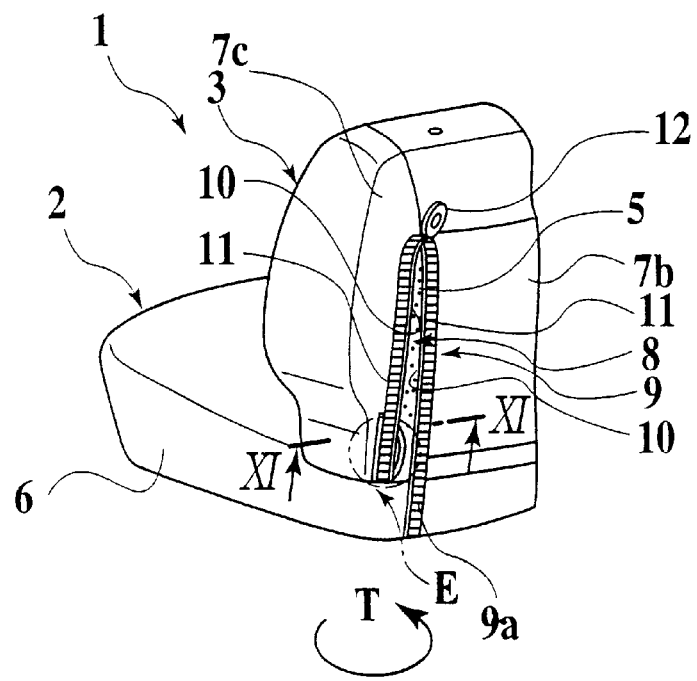
FIG. 9 is a perspective view corresponding to FIG. 8 in a state bending back the slide fastener in FIG. 8.
Figure 10:
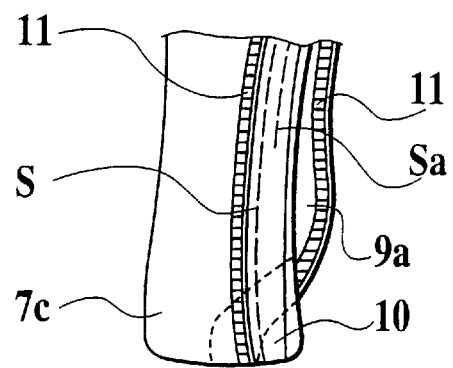
FIG. 10 is an enlarged perspective view as seen from a rightward direction of an E portion in FIG. 9.
Figure 11:
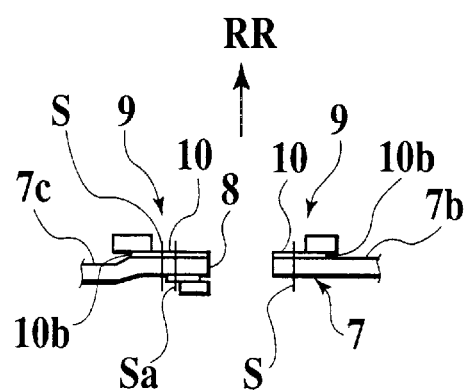
FIG. 11 is a cross sectional view along a line XI—XI in FIG. 9.
Figure 12:
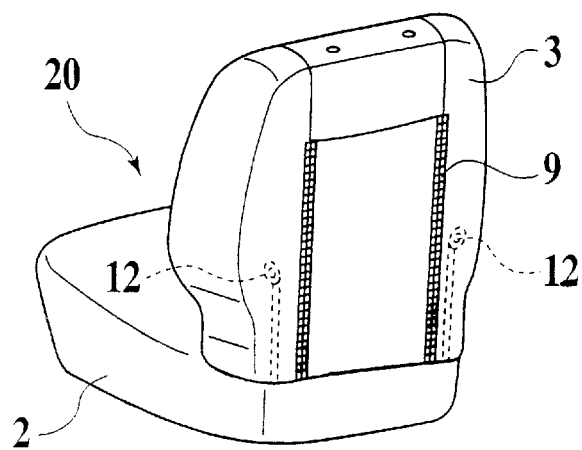
FIG. 12 is a perspective view of a state of closing the slide fastener from the state shown in FIG. 9.

FIGS. 8 to 12 show an embodiment in accordance with the present invention, in which FIG. 8 is a perspective view as seen from an oblique rear portion in a state of opening a slide fastener of a seat, FIG. 9 is a perspective view corresponding to FIG. 8 in a state of bending back a lower end portion of one of the slide fastener in FIG. 8, FIG. 10 is an enlarged perspective view of an E portion in FIG. 9, FIG. 11 is a cross sectional view along a line XI—XI in FIG. 9, and FIG. 12 is a perspective view of a state of closing the slide fastener from the state shown in FIG. 9.

Reference numeral 20 denotes a seat in accordance with the present invention, and, as shown in FIG. 8, the seat 20 is constituted by a seat cushion 2 and a seat back 3, and each of the structural members comprises a frame (not shown), a pads 4,5 (5) formed by a polyurethane foam or the like covering the frame and having a cushion characteristic, and a skins 6,7 (7) made of a fabric or the like covering the pads 4 and 5.

Among the skins 6 and 7, for example, the skin 7 provided in the seat back 3 is structured such as to form a portion easily viewed from an occupant on a design, for example, both shoulder portions 7a and 7a (in the drawing, only one shoulder portion 7a is shown but the other shoulder portion 7a is omitted) in a bag shape and form laterally separated slits 8 on a rear portion 7b.

As shown in FIG. 11, tapes 10 and 10 of a slide fastener 9 are fixed to a the rear RR surface in the rear portion 7b of the skin 7 along the slit 8 by sewing S. Engaging elements 11 and 11 are fixed to edge portions 10b and 10b in far sides of the respective tapes 10 and 10, as shown in FIG. 10. A slider 12 is previously engaged with an upper end portions of the engaging elements 11 and 11.

Figure 3:
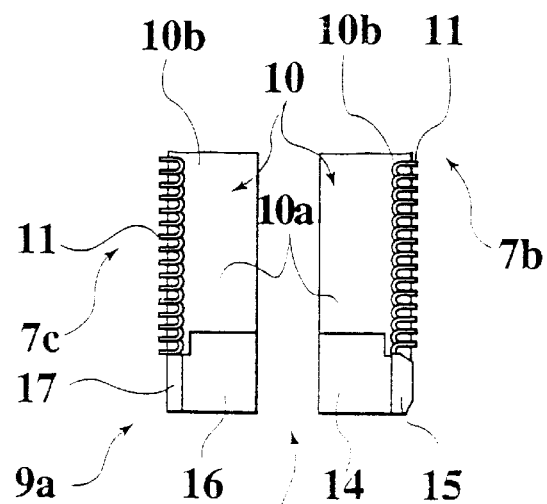
FIG. 3 is an enlarged plan view of a D portion in FIG. 1
Figure 4:
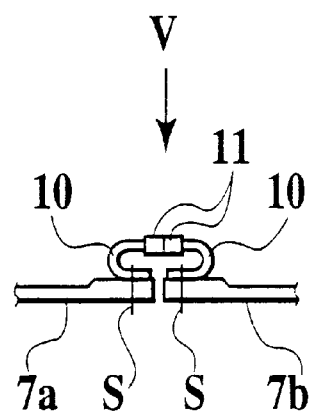
FIG. 4 is a cross sectional view in a state of closing the slide fastener in the state shown in FIG. 2.
Figure 5:
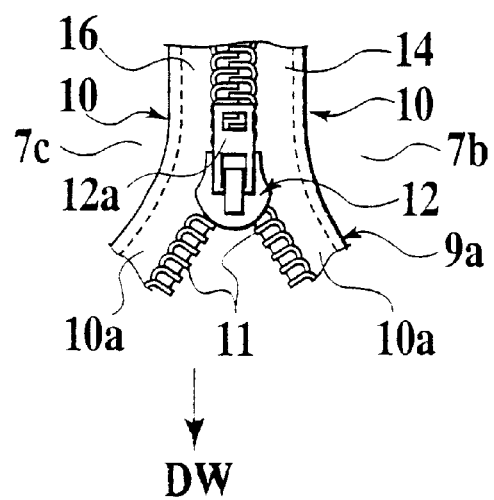
FIG. 5 is a plan view which explains an operation in the middle of closing the slide fastener as seen from an arrow V in FIG. 4.
Figure 6:
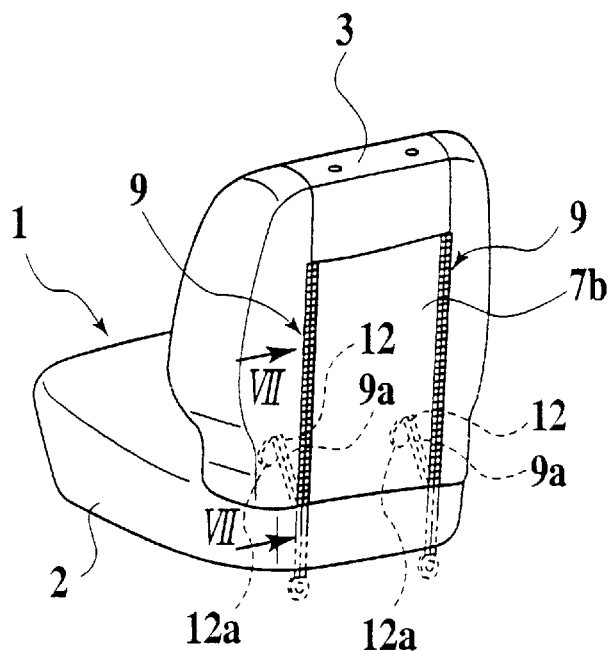
FIG. 6 is a perspective view as seen from an oblique rear portion in state of closing a slide fastener of a seat.
Figure 7:
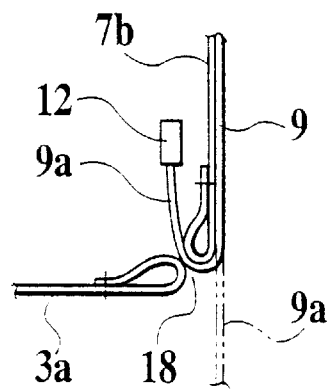
FIG. 7 is a cross sectional view along a line XII—XII in FIG. 6.

Lower end portions 9a of the slide fastener 9, that is, lower end portions 10a of the tapes 10 are positioned downward by a size H a position of the lower end portion 3a of the seat back 3, as shown in FIG. 8, and a stopper 13 is provided in the lower end portions 9a, as shown in FIG. 3.

The engaging element 11 in one side (a left side in FIG. 9) of the engaging elements 11 and 11 is supported to a portion apart from the slit 8 at a position along the rear portion 7b and the side portion 7c of the skin 7, as shown in FIGS. 9 to 11. At a position below the lower end portion 3a of the seat back 3, the tape 10 is 180 degrees twisted and in a substantially horizontal direction (a direction of an arrow T in FIG. 9) near the lower end portion of the side portion 7c of the skin 7. The engaging element 11 is supported to the side portion 7c of the skin 7 by a sewing Sa so that the engaging element 11 is disposed at substantially the same position as that of the slit 8 at a time of bending upward of the back surface of the side portion 7c.

Therefore, in accordance with the embodiment, due to the structure mentioned above, the first reinforcing tape 14 is previously twisted in a front side by holding the butterfly rod 15 of the slide fastener 9 shown in FIG. 3. In this state, the engaging elements 11 and 11 are fastened by moving the slider 12 on the engaging elements 11, and the slit 8 can be put in a closed state. Accordingly, the rear portion 7b of the skin 7 and the side portion 7c and 7c (only one side portion 7c is shown but the other side portion 7c is omitted) of the skin 7 are joined. Since the engaging elements 11 and 11 are released from each other by the slider 12, it is possible to put the slit 8 in an opening state.

The slider 11 is guided to the back side of the skin 7 by the one engaging element 11 bent from the lower end portion 11a of the engaging element 11, and as shown in FIG. 12, it is possible to stably receive the end portions of the slide fastener 9 into a predetermined position of the skin of the seat 1, and it is hard to draw out the slider 12 after received.

The above explanation is representatively given to the seat back 3 of the seat 1, however, the present invention is not limited to the seat back 3 and can be applied to the seat cushion 2, and the same effect as that of the seat back 3 can be obtained. That is, as is employed in the explanation of the first embodiment, the gist of the present invention can be understood by replacing a vertical relation such as the front end portion or the rear end portion by the lateral relation in an expression of the lower end portion.

While preferred embodiments of the present invention have been described using specific terms, such description is for illustrative purposes, and it is to be understood that changes and variations may be made without departing from the spirit or scope of the following claims.

What is claimed is:

1. A structure for supporting a skin of a seat, comprising:
   a skin covering one of among a seat cushion and a seat back which comprise a seat, the skin being provided with a slit, the slit creating two edge portions along the slit of the skin;
   elements of a slider fastener supported to both of the two edge portions; and
   a slider of the slide fastener fastening both of the elements so as to close the slit, wherein both of the elements are extended from an end portion of the one of among the seat cushion and the seat back; and wherein
   an end portion of the extended portion of the one of among the elements is bent back to a back surface side of the skin; and
   the end portion of the extended portion of the one of among the elements is fixed to the back surface side of the skin.

2. The structure for supporting a skin of a seat according to claim 1, further comprising:
   fabric tapes supported on both of the edge portions along the slit of the skin, both of the tapes being supported on an outer side surface of the skin, and both of the elements being supported on both of the tapes respectively, wherein both of the tapes are extended from an end portion in one side of the one of among the seat cushion or the seat back;
   one of the extended tapes is twisted at a suitable position; and
   the one of the extended tapes which is twisted is bent back to the back surface side of the skin and supported on the skin at a portion apart from an end portion of a bent back portion.

3. The structure for supporting a skin of a seat according to claim 2, wherein
   the slit is formed substantially in a vertical direction; and
   both of the tapes are extended downward.

4. The structure for supporting a skin of a seat according to claim 3, wherein
   a further slit is formed in the skin and the slit and the other slit are parallel to each further.

5. A structure for supporting a skin of a seat, comprising:
   a skin covering one of among a seat cushion and a seat back which comprise a seat, the skin being provided with a slit, the slit creating two edge portions along the slit of the skin;
   elements of a slider fastener supported to both of the two edge portions; and
   a slider of the slide fastener fastening both of the elements so as to close the slit, wherein both of the elements are extended from an end portion of the one of among the seat cushion and the seat back; and wherein
   an end portion of the extended portion of the one of among the elements is bent back to a back surface side of the skin; and
   the end portion of the extended portion of the one of among the elements is fixed to the back surface side of the skin by sewing.

6. The structure for supporting a skin of a seat according to claim 5, further comprising:
   fabric tapes supported on both of the edge portions along the slit of the skin, both of the tapes being supported on an outer side surface of the skin, and both of the elements being supported on both of the tapes respectively, wherein both of the tapes are extended from an end portion in one side of the one of among the seat cushion or the seat back;
   one of the extended tapes is twisted at a suitable position; and
   the one of the extended tapes which is twisted is bent back to the back surface side of the skin and supported on the skin at a portion apart from an end portion of a bent back portion.

7. The structure for supporting a skin of a seat according to claim 6, wherein
   the slit is formed substantially in a vertical direction; and
   both of the tapes are extended downward.

8. The structure for supporting a skin of a seat according to claim 7, wherein
   a further slit is formed in the skin and the slit and the further slit are parallel to each other.

* * * * *

UNITED STATES PATENT AND TRADEMARK OFFICE
CERTIFICATE OF CORRECTION

PATENT NO. : 6079779
DATED : June 27, 2000
INVENTOR(S) :
Tanaka, et al.

It is certified that error appears in the above-indentified patent and that said Letters Patent is hereby corrected as shown below:

```
Claim 4, line 3, change "other" to --further--.
Claim 4, line 4, change "further" to --other--.
```

Signed and Sealed this

Twenty-fourth Day of April, 2001

Attest:

NICHOLAS P. GODICI

Attesting Officer     Acting Director of the United States Patent and Trademark Office